No. 692,283. Patented Feb. 4, 1902.
J. N. HARRIS.
PROCESS OF REFINING OILS.
(Application filed Nov. 2, 1898.)
(No Model.)
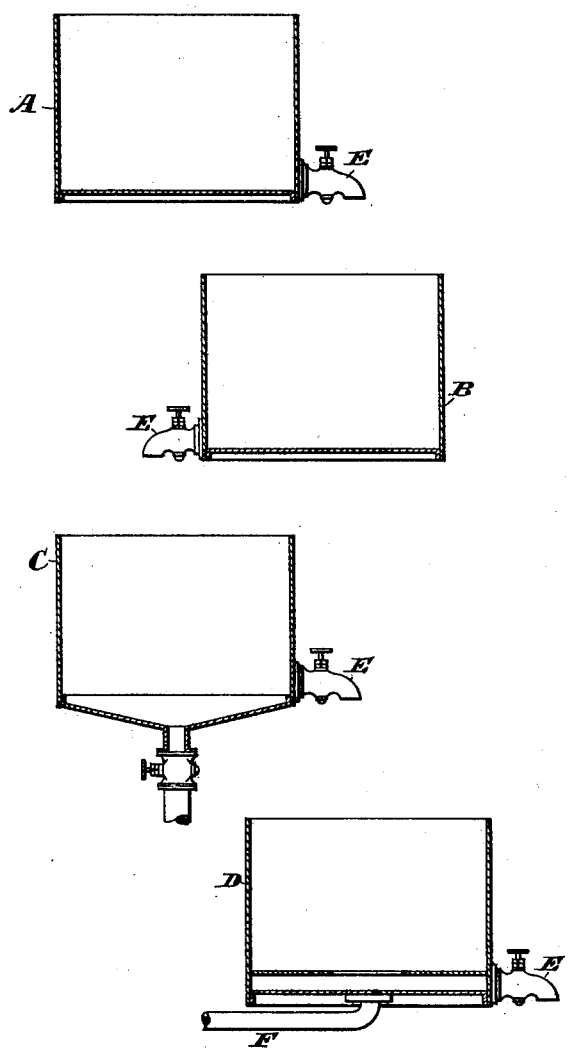

UNITED STATES PATENT OFFICE.

JOHN NUGENT HARRIS, OF SOUTH NORWOOD, ENGLAND, ASSIGNOR TO THE GLOBE TRADING COMPANY, LIMITED, OF LONDON, ENGLAND, A CORPORATION OF GREAT BRITAIN.

PROCESS OF REFINING OILS.

SPECIFICATION forming part of Letters Patent No. 692,283, dated February 4, 1902.

Application filed November 2, 1898. Serial No. 695,274. (No specimens.)

*To all whom it may concern:*

Be it known that I, JOHN NUGENT HARRIS, analytical chemist, of 21 Howard road, South Norwood, in the county of Surrey, England, have invented an Improved Mode of Treating Oils, of which the following is a specification.

There are various oils which, although not ostensibly edible oils, are of such a character that they may be used, and some are now used, with advantage for dietetic purposes. Of such oils cotton-seed oil, groundnut-oil, and fish-oil may be mentioned.

By the term "fish-oil" I mean oil which is obtained by subjecting certain small oily fish to hydraulic pressure in suitable molds, such oil being used in the preparation and preservation of certain foods.

Other oils, such as olive-oil and cod-liver oil, are used for dietetic or medicinal purposes.

Unless prepared with the greatest care all the above-named oils are not so palatable as they might be, and the object of this invention is, first, to purify these and similar oils, and, second, to improve their flavor, by which they will be rendered more suitable than heretofore for dietetic or medicinal purposes.

To this end the invention consists, broadly, in mechanically mixing with the oil a powdered purifying material which will decolorize the oil and precipitate with the impurities and then in aerating in the presence of a suitable alcohol, by which the oil acquires a rich nutty flavor.

In carrying out this invention the crude oil, having been deprived of all solid extraneous matter by straining, is placed in a suitable vessel and the temperature of the oil is raised to from 110° to 130° Fahrenheit by means of a steam-coil or in any other convenient and well-known manner. Powdered animal charcoal in the proportion of one hundredweight of carbon to one ton of oil is then intimately mixed with the oil by mechanical agitation in any convenient manner for about three hours. The mixture is then run into another vessel and, being kept at about a temperature of 120° Fahrenheit, the carbon is then allowed to deposit with the impurities, which chiefly consist of the coloring matters. The clear oil is then run off into another vessel and is subjected to the operation of aeration in the presence of "methylated alcohol" (known commercially as "methylated spirits") containing, preferably, one per cent. of gum-myrrh and one-half per cent. of gum-benzoin. The proportion of the alcohol employed will be from ten to twenty ounces, by volume, to the amount of oil previously mentioned, and the period of aeration will be for about half an hour at a temperature not exceeding 110° Fahrenheit. The oil will then be allowed to stand for twenty-four hours, the temperature being maintained at about 100° Fahrenheit.

The aerating vessel may be of the well-known type—viz., a closed vessel having at the bottom a coil of perforated pipe in connection with the air-supply.

By the above-described treatment of the oil decolorization will be effected and the oil will acquire a pleasant nutty flavor, which will enhance its value for dietetic and medicinal purposes.

If the oil to be treated shows any signs of rancidity, an equal proportion of powdered prepared chalk or whiting may be added to the carbon to be intimately mixed with the oil and which, with the subsequent treatment, will have the effect of removing the rancidity.

In some cases it may be found useful to employ a little steam with the air during the aerating operation.

In the accompanying drawing, A represents, diagrammatically, a vessel in which oil is heated in any convenient manner; B, a vessel in which the oil is mixed with powdered carbon in any convenient manner; C, a vessel in which the purifying material precipitates, and D a vessel in which the clear oil is aerated in the presence of methylated alcohol in any convenient manner.

E in each case represents a draw-off tap, and F is the air-supply pipe.

I claim—

1. The process as herein described of treating oils and consisting in heating the oil to from 110° to 130° Fahrenheit, mechanically mixing with the oil a powdered purifying material as carbon, allowing the mixture to stand while the powdered material with the impurities precipitates, the temperature being maintained at about 120° Fahrenheit, and then aerating in the presence of methylated alcohol as set forth.

2. In the treatment of oils the process of heating the oil to from 110° to 130° Fahrenheit, mechanically mixing a chemically-acting purifying material as powdered animal charcoal with the oil and allowing the oil to stand while the charcoal with the impurities precipitates, the temperature being maintained at about 120° Fahrenheit, as described.

3. In the treatment of oils which have been purified and decolorized the process of aerating in the presence of methylated alcohol containing gum-myrrh and gum-benzoin in substantially the proportions specified, as and for the purpose described.

4. In the treatment of rancid oils of the character specified the process of heating the oil to from 110° to 130° Fahrenheit, mechanically mixing the oil with powdered carbon and powdered prepared chalk for the purpose of neutralizing the free acids in the oil, and allowing the mixture to stand while the powdered material and impurities precipitate, the temperature being maintained at about 120° Fahrenheit, and drawing off the purified material and aerating the same in the presence of methylated alcohol, as set forth.

City of Cork, Ireland, October 5, 1898.

JOHN NUGENT HARRIS.

Witnesses:
E. M. TOUZEAU,
THOMAS EDWARD CHECKSFIELD.